Oct. 19, 1965 L. HEDSTROM 3,213,404

MEANS FOR CONNECTING ELECTRICAL CONDUCTORS

Filed Aug. 1, 1961 2 Sheets-Sheet 1

INVENTOR.
LARS HEDSTROM

BY John Babis, Jr.

ATTORNEY

Oct. 19, 1965 L. HEDSTROM 3,213,404

MEANS FOR CONNECTING ELECTRICAL CONDUCTORS

Filed Aug. 1, 1961 2 Sheets-Sheet 2

INVENTOR.
LARS HEDSTROM
BY John Babis Jr.
ATTORNEY

United States Patent Office 3,213,404

Patented Oct. 19, 1965

3,213,404
MEANS FOR CONNECTING ELECTRICAL CONDUCTORS

Lars Hedstrom, Mendham, N.J., assignor, by mesne assignments, to The Thomas & Betts Co., a corporation of New Jersey Filed Aug. 1, 1961, Ser. No. 128,497
5 Claims. (Cl. 339—97)

This invention relates generally to the art of mechanically connecting electrical conductors and more particularly to a method of and means for effecting a tenacious, frictional, low resistance electrical connection between various forms of pin or prong-like conductors or wire terminal leads and thin sheet, film, layer or ribbon-like ductile conductive element or elements enclosed in a flat or cylindrical plastic laminate, insulated flat conductor cable or formed on printed circuit boards.

Conventional flat conductor cable is a conductor construction consisting of ribbon-like strips of thin copper imbedded in a ribbon of yieldable plastic insulation, usually "Mylar," which has gained wide interest in the electronic industry and particularly in military electronics. This interest is due to its simple construction, small size, flexibility and relatively low cost. Heretofore, such flat conductor cable has not had wide acceptance in the art due to the difficulty that has been experienced in making approved simple connections to the conductor elements in such flat cable, both at its ends for splicing and for making connections to other types of wiring or to circuit components and equipment, and for taps for breaking-off connections at various points along its length. Moreover, another difficulty has been the complete removal of its insulation and the fact that after the removal of the insulation, there is little strength in the bare copper strips on which to make or attach connecting elements of comparable size.

Conventional methods of making direct electrical connections mechanically were not practical or satisfactory heretofore in miniaturized complex electronic instruments and/or circuits for the reason that the utilization of flat conductor cable, printed circuit boards and the like therein plus the small terminal leads of miniature components such as condensers, resistors, diodes, capacitors and the like precluded soldering, dip-soldering, crimping or eyeletting of such connections because of the fragile nature of the conductive elements embraced therein.

The underlying inventive concept embraced herein which is believed to be new in the art involves the impaling of a pin, tack, tooth or prong-like terminal lead, or the wire terminal leads of miniaturized components, directly on into or through a pin-cushion or sandwich like terminal laminate which comprises thin, flat copper sheets or strips within an insulation cover which is laminated or reinforced on both sides or all-around with a relatively thick layer of yieldable plastic material such as polyethylene, for example, whereby the impaling of pin, tooth or prong-like terminal connectors or the wire terminal leads of miniature components on into or therethrough assures firm, vibration proof contact therein and difficulty of removal therefrom.

Thus, the mechanical contact established within the laminate is and remains free of moisture, dirt or other contaminant which might cause subsequent failure. Although it is not believed necessary, the contacting pin or wire lead may, if desired, protrude through the laminate and be subsequently turned to one side or stapled or caused to be deflected to one side by a more rigid layer of plastic to increase its mechanical strength.

Accordingly, it is an object of the invention to provide a method of and means for making direct electrical connections with extremely thin, minimum mass conductive elements and the terminal leads of miniature components and/or single wire conductor leads without soldering, dip-soldering, crimping, eyeletting or other auxiliary attaching means.

Another object of the invention is to provide a flat conductor cable having laminated connector portions integral therewith whereby the conductive elements in said cable are adapted to be connected to a like number of separate conductor terminal leads by impaling said laminated connector portions thereon in imbedded, frictionally secured relation therewith.

A further object of the invention is to provide laminated terminal post connectors adapted to be secured on a printed circuit board with the conductive element in each of said connectors, in contact with the conductive circuit trace etched on said circuit board, for connecting the terminal leads of separate wire conductors or the terminal leads of miniature components to said etched circuit trace through said terminal posts in impaled, frictionally held, angularly spaced, parallel relation about the periphery of said terminal posts.

Another object of the invention is to provide a laminated terminal post connector adapted to be secured to a supporting panel or the like for securing separate conductor terminal leads thereto in impaled, frictionally held, spaced, parallel relation whereby said conductor terminal leads are interconnected through the conductive element within said terminal post.

Another object of the invention is to provide a laminated terminal splice connector adapted for connecting a pair of conductor terminal leads in spaced end-to-end relation by impaling each of said conductor lead substantially axially of one end of said terminal connector in guided, frictionally held relation.

The novel features characteristic of the invention are set forth with particularity in the appended claims. The invention itself, however, both as to its organization and method of operation, together with additional objects and advantages thereof, will best be understood from the following description of a specific embodiment thereof, when read in connection with the accompanying drawings, in which:

Figure 5:
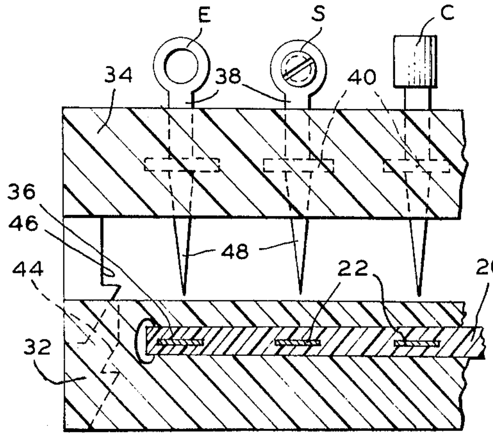
Figure 6:
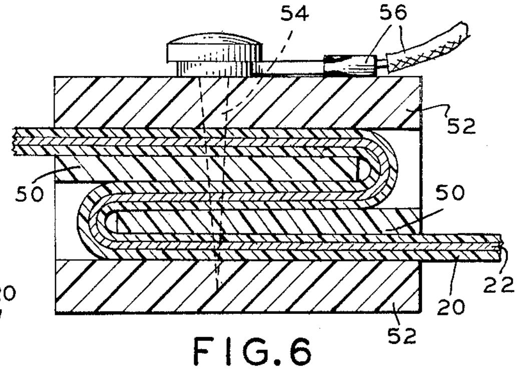
Figure 7:
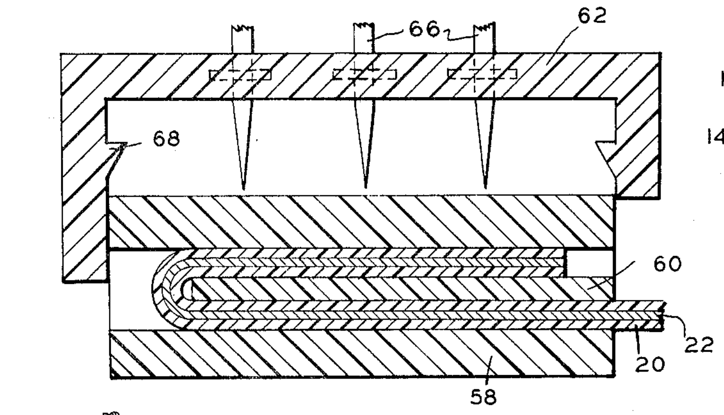
Figure 8:
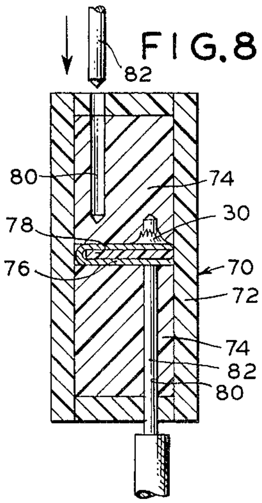
Figure 9:
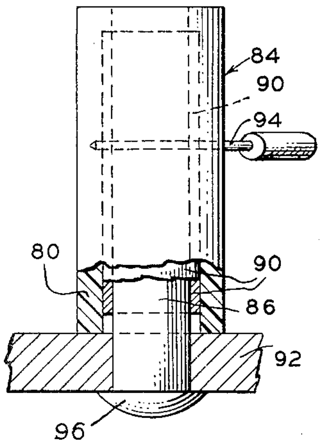
Figure 10:
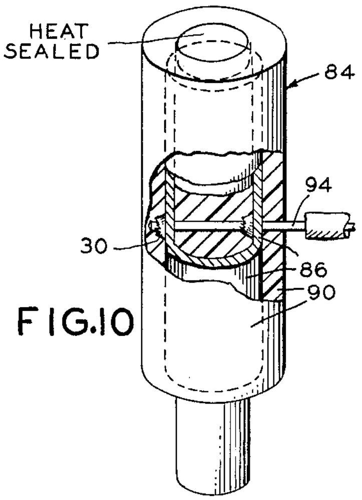

FIG. 5 is an enlarged cross-sectional view of a portion of a flat conductor cable laminate illustrating the impalement thereof on different forms of pin or prong-like conductive terminals, the laminate comprising two halves joined in detachably locked relation, and the free ends of the pin-like terminals adapted for the attachment thereto of an insulated flexible conductor by means of a screw, soldering or crimping;

FIG. 6 is an enlarged longitudinal sectional view of a laminated intermediate portion of a flat conductor cable in which the cable portion is reversely folded upon itself in spaced, laminated relation and as impaled on a pin-like conductive terminal element;

FIG. 7 is a fragmentary longitudinal sectional view similar to FIG. 5, wherein an end portion of a flat conductor cable is folded upon itself in spaced laminated relation, the laminate, as in FIG. 5, comprising complementary sections adapted to be joined in detachably locked relation;

FIG. 8 is an enlarged vertical sectional view of a modified form of the invention in which the laminate comprises a cylindrical terminal splice connector adapted for inpaling a conductive terminal lead in each end thereof in frictionally held relation therewith to connect the impaled leads through the conductive element within said laminate;

FIG. 9 is a similar, enlarged laminate in the form of a turret terminal post connector shown secured to a panel support for the impalement of conductor terminal leads radially thereof in spaced, parallel relation to connect the impaled terminal leads through the conductive element within said laminate;

FIG. 10 is a similar enlarged view of a plastic laminate partly in section and illustrating the impalement of a conductor terminal lead radially thereof and the manner in which a connection is established between the impaled terminal lead and the conductive metal element imbedded in the laminate.

Figure 14:
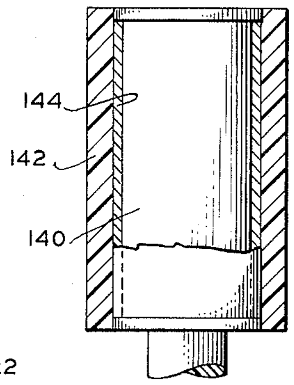
Figure 11:
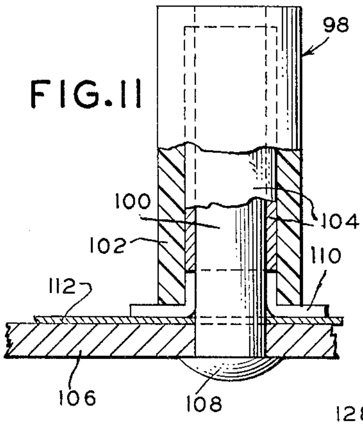
Figure 12:
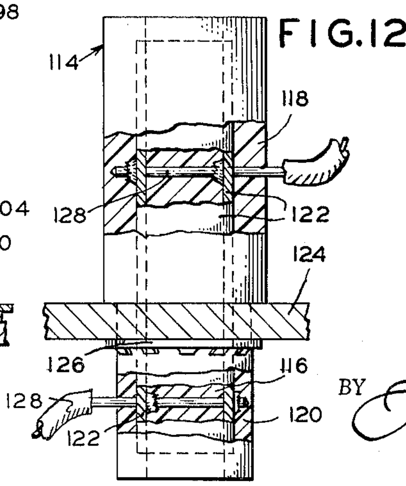
Figure 13:
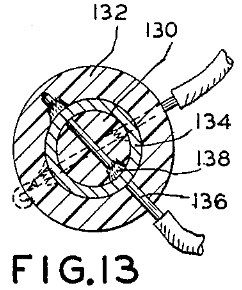

FIG. 11 is a similar view of a laminate in the form of a terminal post connector shown suitably secured on a printed circuit board with the bottom end of its conductive element exposed and extending normal thereto in contact with the conductive element etched on said board whereby conductor terminal leads are connected to the etched circuit element on said board indirectly through the conductive element within said laminate;

FIG. 12 is a similar enlarged laminate in the form of a "feed through" terminal post connector shown suitably secured to a panel support and extending above and below the support for the impalement of terminal conductor leads radially thereof above and below said panel in spaced parallel relation whereby to connect the impaled terminal leads though the conductive element within said laminate;

FIG. 13 is an enlarged cross-sectional view of a terminal post laminate showing the conductive element between the telescoped plastic members, comprising the terminal post laminate, and the manner in which the conductive element is extruded at the points of impalement of conductor terminal leads thereinto or therethrough in frictionally held relation therewith, the protruding end of one terminal lead being turned over on the outer periphery of the laminate by way of example; and FIG. 14 is a fragmentary sectional view, illustrating a manner in which a thin, conductive metal element may be recesses in the periphery of the inner plastic member of a terminal post connector laminate flush therewith.

Referring to the drawings and to FIGS. 1 through 4, a sectional portion of a flat conductor cable 20, including a plurality of conductive strips 22, is shown sandwiched or otherwise disposed between a pair of relatively thick, flat sections 24, of polyethylene plastic, for example, in laminated relation therewith, the plastic sections 24 being secured on the cable end portion 20, either by means of suitable staples or bonded thereon by means of a suitable adhesive, cement or the like. An end portion of the flat conductor cable 20, so provided, forms a connector laminate section thereon adapted to be impaled on pin-like conductive terminal members 26 to connect each of said members 26 to one of the thin, ribbon-like conductive strips 22, within the cable 20.

Figures 3, 4:
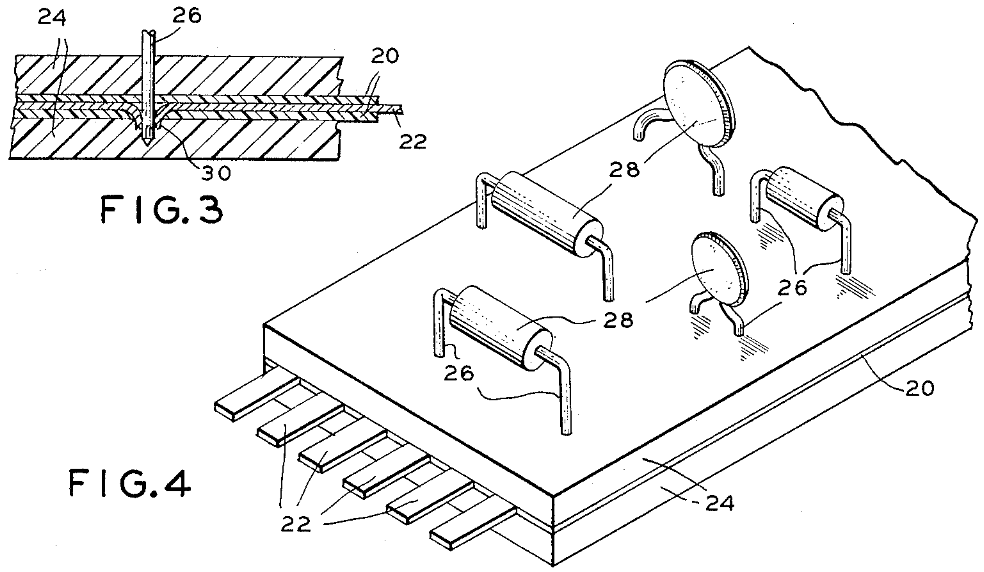
FIG. 3 is a similar view showing the laminated portion of a flat conductor cable after its impalement on a pointed conductive terminal lead and the manner in which the conductive element of the cable is extruded by the terminal lead forming a contact surface having a length many times greater than the thickness of the conductive element of said cable.
FIG. 4 is an enlarged, fragmentary perspective view illustrating a laminated portion of a flat conductor cable as impaled on the conductive terminal leads respectively of a plurality of miniature circuit components in imbedded, frictionally held relation with the conductive and laminating elements of said cable portion.

In impaling the laminated portion of the flat conductor cable 20 on two or more pin-like, conductive terminal members 26, the pointed ends thereof extrude an opening through the ductile conductive strips 22 of the cable 20, whereby portions thereof at the points of extrusion are deflected or displaced out of the plane thereof as at 30, in FIG. 3, to provide a contact with the terminal members 26, along a length thereof many times greater than the normal thickness of the conductive cable strips 22, usually .0027 of an inch, thus assuring a good, low-resistance connection with the impaled terminal members 26. Alternatively, FIG. 4 illustrates the manner in which the conductor terminal leads 26 of various types of miniature circuit components 28, are similarly impaled in the cable laminate in tenaciously imbedded, frictionally held relation therewith.

Further in accordance with the invention, the laminated cable portion may also take the form of a pair of complementary, thick polyethylene plastic sections 32 and 34, as illustrated in FIG. 5, wherein an end portion of a flat conductor cable 20 is disposed in a rectangular slot 36, provided therefor in the plastic section 32 in sliding fit relation, the plastic section 34 having a plurality of pin-like terminal members 38, flanged as at 40, partially molded therein. The outer free end of each of the terminal members 38 may be provided with either an eyelet portion E, a screw portion S or a crimpable sleeve C, adapted for securing a flexible wire conductor thereto in known manner. The plastic sections 32 and 34 are each further provided with a toothed portion 42 and a complementary latch portion 44, whereby the plastic sections are adapted to be superposed one upon the other in detachably locked relation. Thus, when the same plastic sections 32 and 34 are brought together in locked relation, the pointed end portion 48 of the conductive terminal members 38 are impaled in the plastic members 32 and 34, and the conductive metal strips 22, within the flat conductor cable 20 in frictionally held, low resistance current transfer relation.

Figure 1:
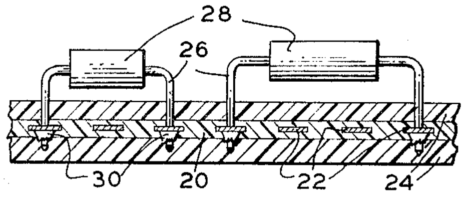
FIG. 1 is an enlarged, fragmentary cross-sectional view of a laminated portion of a flat conductor cable illustrating the manner in which the terminal leads of miniature components are impaled through the ductile conductive elements of said cable in imbedded, frictionally held relation therewith.

Further in accordance with the invention and as shown in FIG. 6, a laminated portion of a flat conductor cable 20, as above described, may also be formed intermediate the ends thereof by reversely folding a selected portion thereof upon itself in spaced parallel relation with a plurality of relatively thick, flat sections of yieldable plastic 50 and 52 disposed respectively between the folds and superimposed on the outer sides thereof whereby one or more tap connections may be made with the conductive metal strips 22 of the cable 20, by impaling a like member of pin-like conductive terminal members 54 into the stacked sections of yieldable plastic 52 in imbedded frictionally held relation therewith, whereby each of the pin-like terminal members 54 passes through its correlated conductive strip 22 of the cable 20 a plurality of times in extruded relation therewith, as indicated at 30 in FIGS. 1 and 3, the inner ends of the terminal members 54 extending short of the outer side of the bottom or lowermost plastic section 52. Thus, two or more insulated, flexible wire conductors 56 may be connected indirectly with a like number of conductive strips 22 within the cable 20 anywhere along the length thereof.

A modified form of the laminate shown in FIG. 5 is illustrated in FIG. 7, wherein the laminate comprises a hollow plastic section 58, having a partition 60 therein in spaced, parallel relation whereby to receive a folded end portion of a flat conductor cable 20 therebetween in frictionally fitted relation, and a complementary plastic member 62 having a plurality of flanged, pin-like conductive terminal members 66, anchored therein in spaced, depending alignment, the plastic member 62, including toothed side walls 68, whereby it is adapted to be detachably secured on the base section 58, with the pointed end portions of the terminal pins 66, impaled in the plastic base section 58, in frictionally held relation therewith, whereby the terminal pins 66 are connected to the conductive strips 22 of the flat conductor cable 20 in the manner shown at 30 in FIGS. 1 and 3.

Further in accordance with the invention and as illustrated in FIG. 8, a plastic laminate as described in connection with the preceding figures is in the form of a cylindrical member to provide a butt-end splice connector 70, comprising an outer sleeve 72, of thick polyethylene plastic having a plastic plug 74 frictionally secured in each end thereof with a thin disc of ductile conductive metal 76, folded upon a relatively thick plastic disc 78 and disposed as a unit between the inner ends of the plastic plugs 74, in the outer sleeve 72 in firm contact therewith.

As shown in FIG. 8, the outer ends of the plastic plugs 74 are each provided with an opening 80, parallel with and to one side of the axial center of the plugs 74, whereby to provide means for guiding the entrance of a pointed conductive terminal lead 82 into each of the respective plastic plugs 74, and through their closed inner ends and the folded conductive metal disc 76, including the plastic disc 78 therebetween in impaled, frictionally held relation therewith, whereby the conductive terminal leads 82 are indirectly connected by means of the folded conductive metal disc 78. The open ends of the outer plastic sleeve 70 may be closed by means of a plastic disc heat-sealed therein having an opening therethrough in registration with the guide opening in each of the plastic plugs 74, or the open ends of the plastic sleeve 70 may be provided with a small annular shoulder internally thereof whereby the plastic plugs 74 may be snapped, by means of a force fit, past the respective annular shoulders into position within the outer sleeve 70.

Further in accordance with the invention and as shown in FIGS. 9 and 10, a cylindrical plastic laminate in the form of a terminal post connector 84, wherein a yieldable, solid, inner plastic member 86 is telescoped within a thick, outer, yieldable plastic sleeve with a thin, ductile conductive metal sheet or sleeve 90, frictionally secured therebetween, one end of the inner plastic member 86, extending beyond one end of the plastic sleeve 88 whereby the laminated terminal post 84 is adapted to be secured in a suitable opening provided therefor in a panel support 92 or the like by upsetting, for example, the free end of the inner plastic member 86, as indicated at 96. With the terminal post 84 in fixed position, a plurality of conductor terminal leads 94 may be readily interconnected therein, indirectly by means of the imbedded conductive metal sleeve 90, by impaling the conductor terminal leads 94 radially of and into the terminal post 84 in spaced parallel, frictionally held relation therewith by the yieldable characteristics of the polyethylene plastic and the extruded contact made between the conductor terminal leads 94, and the imbedded, thin, conductive metal sleeve 90.

Further in accordance with the invention, a modified form of laminated terminal post connector is shown at 98 in FIG. 11, wherein the inner yieldable plastic member 100, extends beyond one end of the outer, yieldable plastic sleeve 102, telescoped thereon in frictionally held relation with the thin, ductile, conductive metal sleeve 104 secured therebetween, whereby one end portion of the conductive sleeve 104 is exposed and turned normal thereto for securing the extended end of the inner plastic member 100 in an opening provided therefor in a printed circuit board 106, as at 108, with the exposed portion 110 of the conductive sleeve 104, in contacting engagement with the conductive circuit trace 112, etched on the circuit board.

Thus, when a conductive terminal lead of a wire conductor or the conductive terminal leads of a circuit component is to be connected with or secured to the conductive circuit trace etched on the printed circuit board, the terminal leads are impaled in the terminal post connector in imbedded, frictionally held relation whereby the terminal leads are indirectly connected to the circuit trace etched on the printed circuit board.

Further in accordance with the invention, a terminal post connector 114, as shown in FIG. 12, comprises an inner plastic member 116, of relatively greater length, and a thick plastic sleeve 118 having a reduced end portion 120, telescoped thereon with a thin, conductive metal sleeve 122, frictionally secured between the inner plastic member 116, and the outer sleeve 118, short of the respective ends thereof. The reduced end portion 120 of the sleeve 118 has a smaller outside diameter than the upper portion thereof, forming an intermediate shoulder therebetween whereby the terminal post connector 114, is also adapted to be mounted on a panel board 124, or the like with its reduced diametral portion 120 extending through a suitable opening provided therefor in the panel board 124, and secured thereon by means of a suitable spring clip, nut or the like 126. Thus, when a plurality of conductor terminals or terminal leads 128, above, below, in front of or in back of a panel, chassis or the like are to be connected, the conductive terminal members 128, below the panel 124, are impaled in the depending sleeve portion 120, of the terminal post, and the conductive terminal members 128 above the panel 124, impaled in the larger plastic sleeve 118, whereby the respective terminal members 128, are interconnected through the thin conductive metal sleeve 122 within the terminal post 114.

Referring to FIG. 13, a transverse section through any of the terminal post connectors shown respectively in FIGS. 9 through 12, illustrates the manner in which a plurality of bare conductor terminals or terminal leads 136, are impaled into the outer plastic sleeve 132, thin conductive metal sleeve 134, and inner plastic member or core 130, whereby portions of the sheet metal sleeve 134, are deflected out of the plane thereof as at 138, and thus form a contacting surface on the intruded conductor terminals 136, having a length many times greater than the normal thickness of the thin conductive metal sleeve 134. Moreover, the ends of the intruded conductor may, if desired, extend through the outer plastic sleeve 132, and the protruding ends turned or bent over on the outer periphery thereof as indicated in dotted lines.

Further in accordance with the invention, and with reference to FIG. 14, the outer diameter of the inner plastic member or core 140, of a terminal post connector, as described in connection with FIGS. 9 through 13, may be reduced intermediate the ends of its largest diameter in an amount equal to the thickness of the thin conductive metal foil, sheet or strip 144, to be placed thereon whereby the same will be flush with the normal diameter of its end portions and the outer plastic sleeve 142, telescoped thereon in frictionally held relation. It is also within the scope of the underlying inventive concept herein described, to form a ductile conductive metal film or coating of copper, gold, silver or the like, of predetermined thickness directly on the outer periphery of the inner plastic member or core, or directly on the inner periphery of the outer plastic sleeve of any of the herein described terminal post conductors, by electro-deposition, sputtering or metallizing methods well known in the art.

It is to be noted that in the impalement of bare conductor terminals or terminal leads of components in or into terminal post connectors, as described in connection with FIGS. 8 through 13, such conductor terminals or component terminal leads are held between the jaws of a suitable pair of needle nose pliers or the like, to impart sufficient rigidity to the point end portion thereof while being forcefully impaled in such terminal post connectors.

Figure 2:
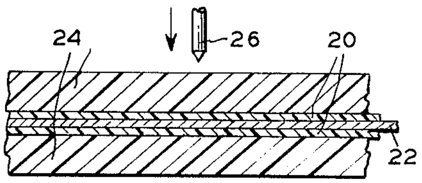
FIG. 2 is an enlarged, fragmentary, longitudinal sectional view of a laminated portion of a flat conductor cable prior to impaling the same on a pointed conductive terminal lead in imbedded, frictionally held relation therewith.

It is also to be noted that while a section of conventional flat conductor cable 20, is shown interposed between two relatively thick, flat sections of plastic 24, in FIGS. 1, 2 and 3, it is also within the scope of the invention to secure a plurality of bare, ductile conductive strip elements 22, directly between the two plastic sections 24 in sandwiched relation.

While the invention has been illustrated and described with respect to several embodiments thereof, it is to be expressly understood that modifications may be made therein without departing from the inventive concept underlying the same. Therefore, the invention is not to be limited except as is necessitated by the prior art and the scope of the appended claims.

I claim:

1. An electrical connector comprising an end portion of an insulated flat conductor cable having a plurality of thin, ribbon-like ductile conductor elements imbedded therein, a relatively thick polyethylene plastic sheet with substantially continuous surfaces superimposed on the opposite sides of an end portion of said cable in abutting laminated relation therewith, and means securing said plastic sheets on said cable end portion with the outer surface of said plastic sheet being exposed, whereby said cable end portion is adapted to be impaled on a plurality of pin-like conductive terminal members as a unit in frictionally held relation therewith to establish a low-resistance connection with the conductor elements imbedded in said cable.

2. A cable connection comprising a thin conductor having substantially flat oppositely disposed continuous surfaces, a thin layer of insulating material contiguous to each of said surfaces, an additional layer of plastic insulating material having substantially continuous surfaces being disposed contiguous to at least a portion of said layer of insulating material covering each of the opposite surfaces of said conductor, each of said additional layers being thicker than said layer and being in alignment with the other of said additional layers, and an elongated terminal member impaling said layers and said conductor and impaling at least a portion of each of said additional layers, whereby said terminal member is engaged with and thereby supported by said additional layers when connected to said conductor.

3. A cable connection comprising a thin conductor having substantially flat oppositely disposed continuous surfaces, a thin flat layer of insulating material contiguous to each of said surfaces, an additional flat layer of plastic insulating material having substantially continuous surfaces being disposed contiguous to at least a portion of said layer of insulating material covering each of the opposite surfaces of said conductor, each of said additional layers being thicker than said layer and being in alignment with the other of said additional layers, and an elongated terminal member impaling said layers and said conductor and impaling at least a portion of each of said additional layers, whereby said terminal member is engaged with and thereby supported by said additional layers when connected to said conductor.

4. A method of making a connection from an elongated terminal member to a cable having a thin conductor with substantially flat oppositely disposed continuous surfaces and a thin layer of insulating material contiguous to each of said surfaces, said method comprising the steps of placing an additional layer of plastic insulating material having substantially continuous surfaces with its inner surface disposed contiguous to at least a portion of the layer of insulating material covering each of the opposite surfaces of the conductor, the outer surfaces of the layer of insulated material remaining exposed, each of the additional layers being thicker than the layer and being in alignment with the other of the additional layers, and impaling the layers and the conductor and at least a portion of each of the additional layers by the terminal member to connect the terminal member to the conductor and to engage the terminal member with respect to the additional layers.

5. A connection for a flat cable having a flat conductor and a layer of insulating material enclosing the flat conductor comprising a pair of flat supporting members of plastic material disposed in an abutting relation with the opposite sides of the flat cable at a common location thereon, each of said supporting members having substantially continuous surfaces and a terminal member pierced through one of said supporting members and the flat conductor and pierced through at least a portion of the other of said supporting members, whereby said terminal member is electrically connected to the flat conductor and engaged and supported by the supporting members.

References Cited by the Examiner

UNITED STATES PATENTS

| | | | |
|---|---|---|---|
| 1,965,004 | 7/34 | Rowell | 339—96 X |
| 2,876,393 | 3/59 | Tally et al. | 339—17 |
| 2,994,059 | 7/61 | Dahlgren et al. | 339—17 |
| 3,089,114 | 5/63 | Cole et al. | 339—17 |

FOREIGN PATENTS

| | | |
|---|---|---|
| 753,875 | 8/56 | Great Britain. |

JOSEPH D. SEERS, *Primary Examiner.*

W. DONALD MILLER, *Examiner.*